United States Patent
Hisatsugu et al.

(10) Patent No.: US 11,178,318 B2
(45) Date of Patent: Nov. 16, 2021

(54) IMAGING DEVICE AND VEHICULAR DISPLAY DEVICE

(71) Applicant: DENSO CORPORATION, Kariya (JP)

(72) Inventors: Shinsuke Hisatsugu, Kariya (JP); Yoshio Oofuka, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/741,569

(22) Filed: Jan. 13, 2020

(65) Prior Publication Data

US 2020/0154008 A1     May 14, 2020

Related U.S. Application Data

(63) Continuation of application No. PCT/JP2018/024096, filed on Jun. 26, 2018.

(30) Foreign Application Priority Data

Jul. 19, 2017     (JP) ............................. JP2017-140167

(51) Int. Cl.
    *H04N 5/225*     (2006.01)
    *B60R 11/04*     (2006.01)
    *G03B 15/00*     (2021.01)

(52) U.S. Cl.
    CPC ................. *H04N 5/2253* (2013.01)

(58) Field of Classification Search
    CPC .... H04N 5/2253; H04N 5/2257; B60R 11/04; G03B 15/00
    See application file for complete search history.

(56) References Cited

U.S. PATENT DOCUMENTS

| | | | |
|---|---|---|---|
| 2008/0089559 | A1 | 4/2008 | Koumura |
| 2016/0185354 | A1* | 6/2016 | Lisseman ............... B60W 10/20 701/36 |
| 2017/0264797 | A1* | 9/2017 | Trinh .................... B60K 37/02 |

FOREIGN PATENT DOCUMENTS

| | | | |
|---|---|---|---|
| JP | 2002254956 A | | 9/2002 |
| JP | 2007055430 A | | 3/2007 |
| JP | 2008094221 A | | 4/2008 |
| JP | 2009223659 A | | 10/2009 |
| JP | 2010105461 A | * | 5/2010 |
| JP | 5122782 B2 | | 1/2013 |
| WO | WO-2019017158 A1 | | 1/2019 |

* cited by examiner

*Primary Examiner* — Ahmed A Berhan
(74) *Attorney, Agent, or Firm* — Harness, Dickey & Pierce, P.L.C.

(57) ABSTRACT

An imaging device is provided in a vehicular display device including a center display portion that displays, at a center of the vehicular display device, information toward a passenger of a vehicle and a pair of lateral portions located lateral to the center display portion. The imaging device includes a camera located in one of the lateral portions to photograph the passenger.

10 Claims, 7 Drawing Sheets

FIG. 7
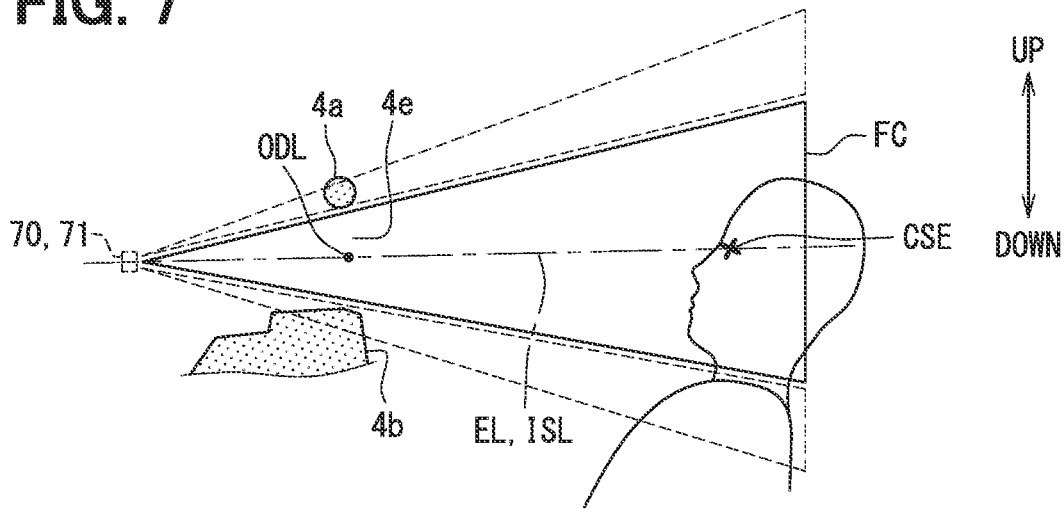
FIG. 8 COMPARATIVE EXAMPLE
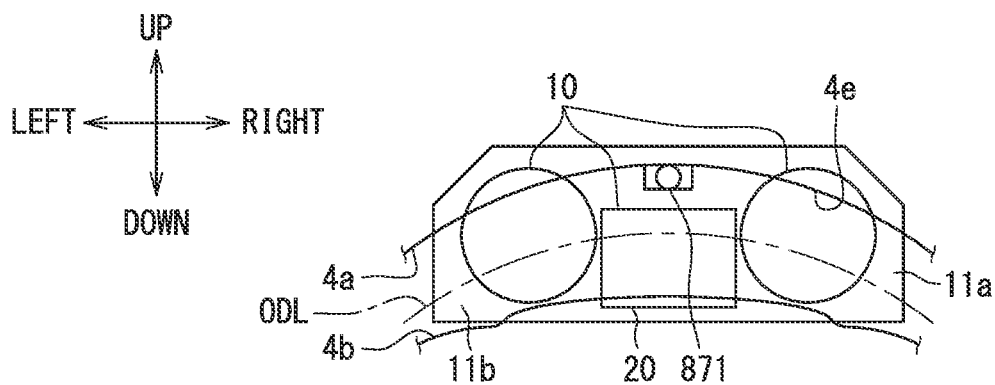
FIG. 9 COMPARATIVE EXAMPLE
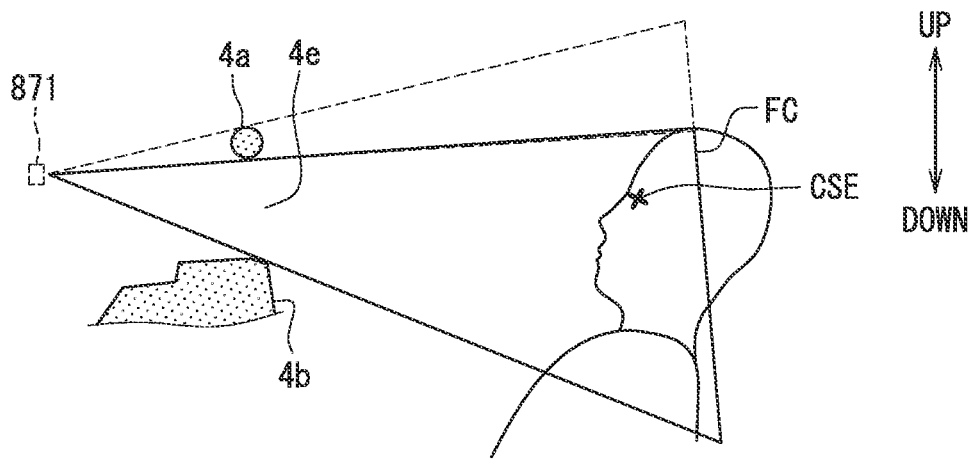

FIG. 10 COMPARATIVE EXAMPLE
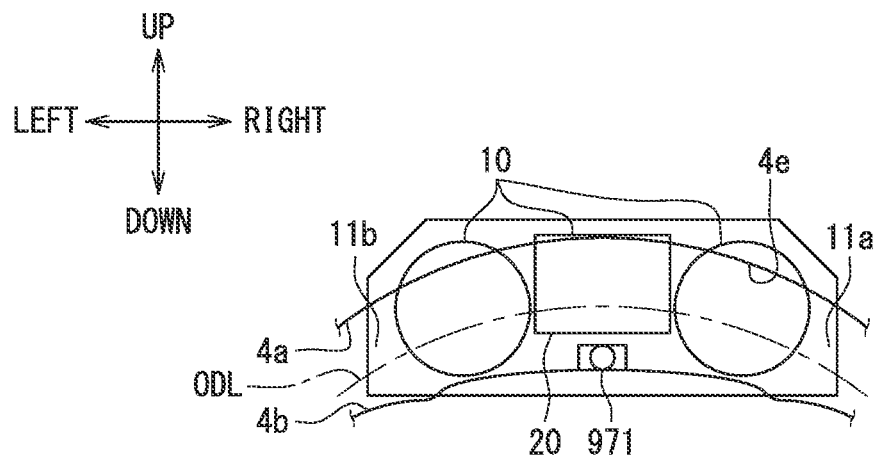
FIG. 11 COMPARATIVE EXAMPLE
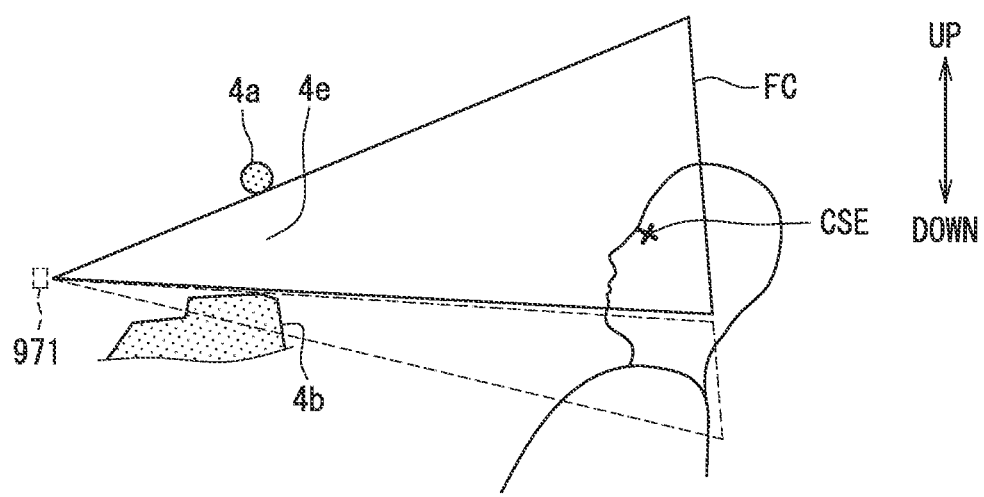

IMAGING DEVICE AND VEHICULAR DISPLAY DEVICE

CROSS REFERENCE TO RELATED APPLICATIONS

The present application is a continuation application of International Patent Application No. PCT/JP2018/024096 filed on Jun. 26, 2018, which designated the U.S. and claims the benefit of priority from Japanese Patent Application No. 2017-140167 filed on Jul. 19, 2017. The entire disclosures of all of the above applications are incorporated herein by reference.

TECHNICAL FIELD

The present disclosure relates to an imaging device and a vehicular display device.

BACKGROUND

An imaging device has been known which is provided in a vehicular display device mounted in a vehicle. Such an imaging device includes a camera for photographing a passenger. The camera is located in a center display portion that displays, at a center of the vehicular display device, information toward a passenger of the vehicle.

SUMMARY

The present disclosure describes an imaging device and a vehicular display device each including a camera for photographing a passenger located in one of a pair of lateral portions lateral to a center display portion.

BRIEF DESCRIPTION OF DRAWINGS

Features and advantages of the present disclosure will become more apparent from the following detailed description made with reference to the accompanying drawings. In the drawings:

FIG. 7 is a cross-sectional view showing a vertical cross section for illustrating the relationship between the camera and the opening portion in the first embodiment;

FIG. 8 is a front view for illustrating a relationship between a camera and an opening portion in a first comparative example;

FIG. 9 is a cross-sectional view showing a vertical cross section for illustrating the relationship between the camera and the opening portion in the first comparative example;

FIG. 10 is a front view for illustrating a relationship between a camera and an opening portion in a second comparative example;

FIG. 11 is a cross-sectional view showing a vertical cross section for illustrating the relationship between the camera and the opening in the second comparative example.

DETAILED DESCRIPTION

Figure 1:
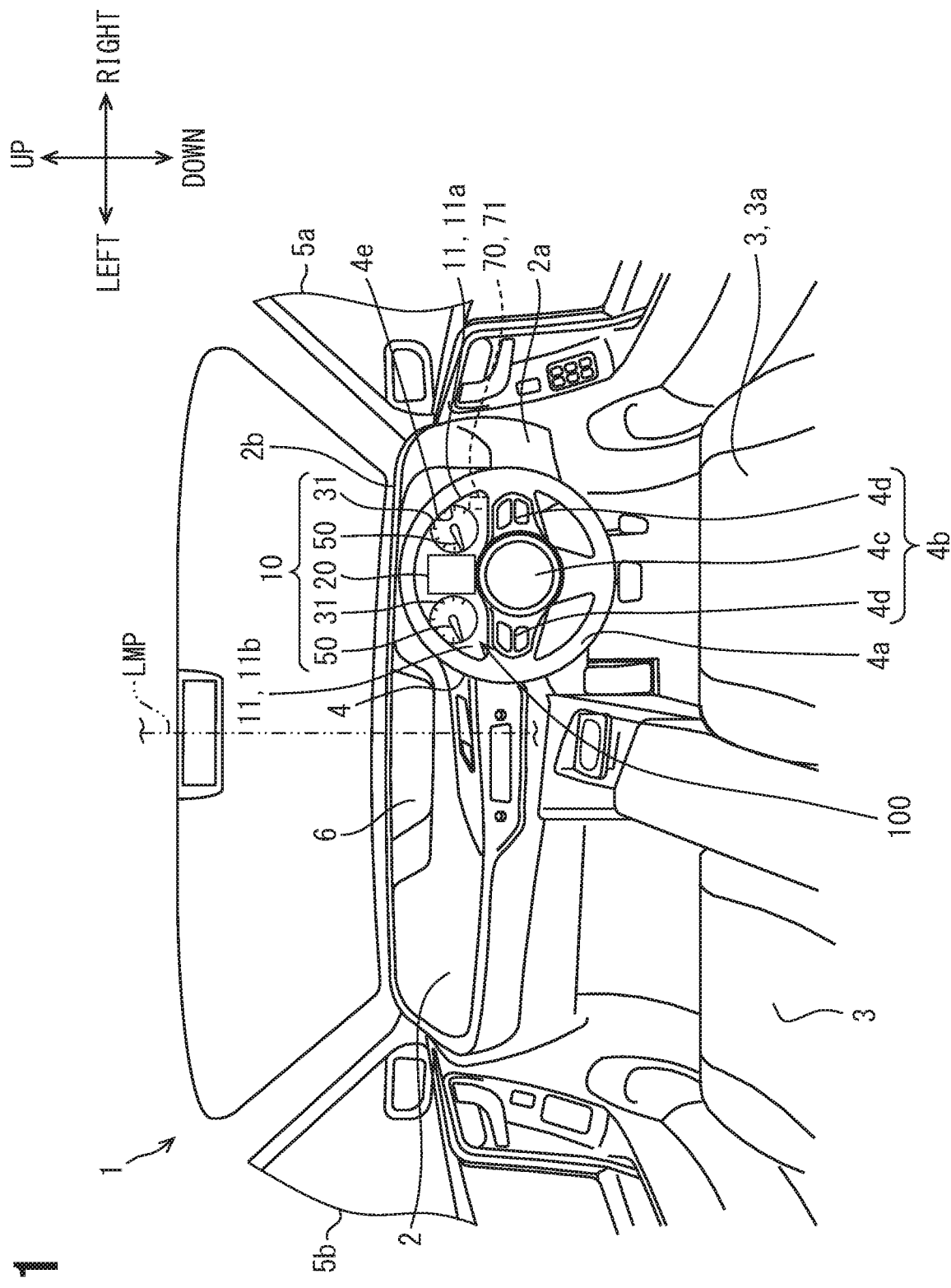
FIG. 1 is a view showing a layout of a vehicular display device including an imaging device in a vehicle in a first embodiment.

In a case where a camera for photographing a passenger is located in a center display portion, due to a space for layout, it may be difficult to lay out individual components to be used for display on the center display portion. As a result, the display on the center display portion may be subjected to a restriction such as a size reduction of an indicator or an image displayed on the center display portion.

In general, of the vehicle display portion, the center display portion is frequently visually recognized by the passenger, and therefore it may be concerned that a place at which the camera is located is conspicuous.

The present disclosure provides an imaging device and a vehicular display device in each of which display is less restricted by a location of a camera for photographing a passenger and each of which has outer appearance less affected by the location of the camera.

According to an aspect of the present disclosure, an imaging device is provided in a vehicular display device that is to be mounted in a vehicle and includes a center display portion that displays, at a center of the vehicular display device, information toward a passenger of the vehicle and a pair of lateral portions located lateral to the center display portion. The imaging device includes a camera located in one of the lateral portions to photograph the passenger.

In such an imaging device, the camera is located in one of the lateral portions located lateral to the center display portion. Such a location of the camera exerts less influence on a layout of individual components used for display on the center display portion. Accordingly, it is possible to suppress the display on the center display portion from being restricted. In addition, since the lateral portions are less frequently visually recognized by the passenger than the center display portion and the passenger is led to pay attention to the center display portion, a place at which the camera is located is less conspicuous. Therefore, it is possible to provide the imaging device in which display is less restricted by the location of the camera for photographing a passenger and which has outer appearance less affected by the location of the camera.

According to another aspect of the present disclosure, a vehicular display device is to be mounted in a vehicle, and includes a center display portion that displays, at a center of the device, information toward a passenger of the vehicle, a pair of lateral portions located lateral to the center display portion, and a camera located in one of the lateral portions to photograph the passenger.

In such a vehicular display device, the camera is located in one of the lateral portions located lateral to the center display portion. Such a location of the camera exerts less influence on a layout of individual components used for display on the center display portion. Accordingly, it is possible to suppress the display on the center display portion from being restricted. In addition, since the lateral portions are less frequently visually recognized by the passenger than the center display portion and the passenger is led to pay attention to the center display portion, a place at which the camera is located is less conspicuous. Therefore, it is possible to provide the vehicular display device in which display is less restricted by the location of the camera for photographing a passenger and which has outer appearance less affected by the location of the camera.

Hereinafter, a plurality of embodiments will be described with reference to the drawings. In each embodiment, sections corresponding to items described in the preceding embodiment are denoted by the same reference numerals, and their repetitive description might be omitted. In each embodiment, in the case where only a part of a configuration is described, the precedingly described embodiment can be applied to the other part of the configuration. It is possible not only to combine parts that can be explicitly combined in the embodiments, but also to partially combine the embodiments even if not explicitly specified if there is no trouble with the combination.

First Embodiment

As shown in FIG. 1, an imaging device 70 according to a first embodiment of the present disclosure is mounted in a vehicle 1 to photograph a passenger of the vehicle 1. The imaging device 70 of the present embodiment is used for a driver status monitor (DSM) which photographs a face of the passenger of the vehicle 1, particularly a driver, as an object to be photographed and processes an image thereof to monitor a status, such as a sleeping status or a distracted status, of the driver.

The imaging device 70 is provided in a vehicular display device 100. The imaging device 70 is disposed, together with the vehicular display device 100, in an instrument panel facing a seat 3 to be occupied by the passenger in a front-rear direction. More specifically, the imaging device 70 is disposed, together with the vehicular display device 100, in a driver seat facing portion 2a of an instrument panel 2 facing a driver seat 3a to be occupied by the driver in the front-rear direction.

In the present embodiment, wordings related to directions such as front-rear, vertical, and lateral directions are defined based on the vehicle 1 in a horizontal plane. Right and left are defined based on the passenger occupying the seat 3 facing forward. In the vehicle 1, between the driver seat facing portion 2a and a head rest of the driver seat 3a, a steering operation portion 4 of the vehicle 1 is disposed. The steering operation portion 4 forms an operation portion to be subjected to a rotating operation by the driver in a steering system which steers the vehicle 1. The steering operation portion 4 has an annular rim portion 4a, and a connecting portion 4b connecting the rim portion 4a to a steering shaft. The connecting portion 4b has a center pad portion 4c disposed over an axis of the steering shaft, spoke portions 4d extending in a radial direction of the rim portion 4a to connect the center pad portion 4c and the rim portion 4a, and the like.

In the steering operation portion 4, an opening portion 4e surrounded by the rim portion 4a and the connecting portion 4b is formed. The opening portion 4e is located at an upper portion of the steering operation portion 4 when the steering operation portion 4 is at a normal position (i.e., position at which the steering operation portion 4 is at a steering angle which allows the vehicle 1 to drive straight ahead) and is formed in a semi-circular shape (or a sectoral shape) having an arcuate upper part.

The driver seat 3a of the present embodiment is disposed at a position rightwardly offset from a longitudinal median plane LMP (a vertical plane extending through a middle point between left and right wheels of an automobile in a straight-ahead position) of the vehicle 1, more precisely, disposed on a right side of the longitudinal median plane LMP. Accordingly, the vehicle 1 of the present embodiment is a so-called right-hand-drive vehicle, and the vehicular display device 100 is also disposed at a position rightwardly offset from the longitudinal median plane LMP, more precisely, disposed on the right side of the longitudinal median plane LMP.

On right and left sides of the vehicle 1, respective side windows 5a and 5b are provided. Since the vehicular display device 100 is rightwardly offset, light from the outside such as sunlight is likely to be incident on the vehicular display device 100 from the side window 5a on the right side of the vehicular display device 100. For example, light at a low angle (0 to 30 degrees) such as morning sunlight or late afternoon sunlight tends to be incident on the vehicular display device 100. On the other hand, an upper surface portion of the instrument panel 2 forms a hood 2b protruding to be closer to the steering operation portion 4 than to the vehicular display device 100 so as to cover the vehicular display device 100 from above. Consequently, the vehicular display device 100 have portions (lateral portions 11 described later) which are likely to be under the shadow of the hood 2b cast by light from the outside incident through the right side window 5a.

Also, in the vehicle 1, in a center portion leftward of the vehicular display device 100, center-located devices 6 such as an information display device other than the vehicular display device 100, an audio device, and an air conditioning operation panel are disposed.

Figure 2:
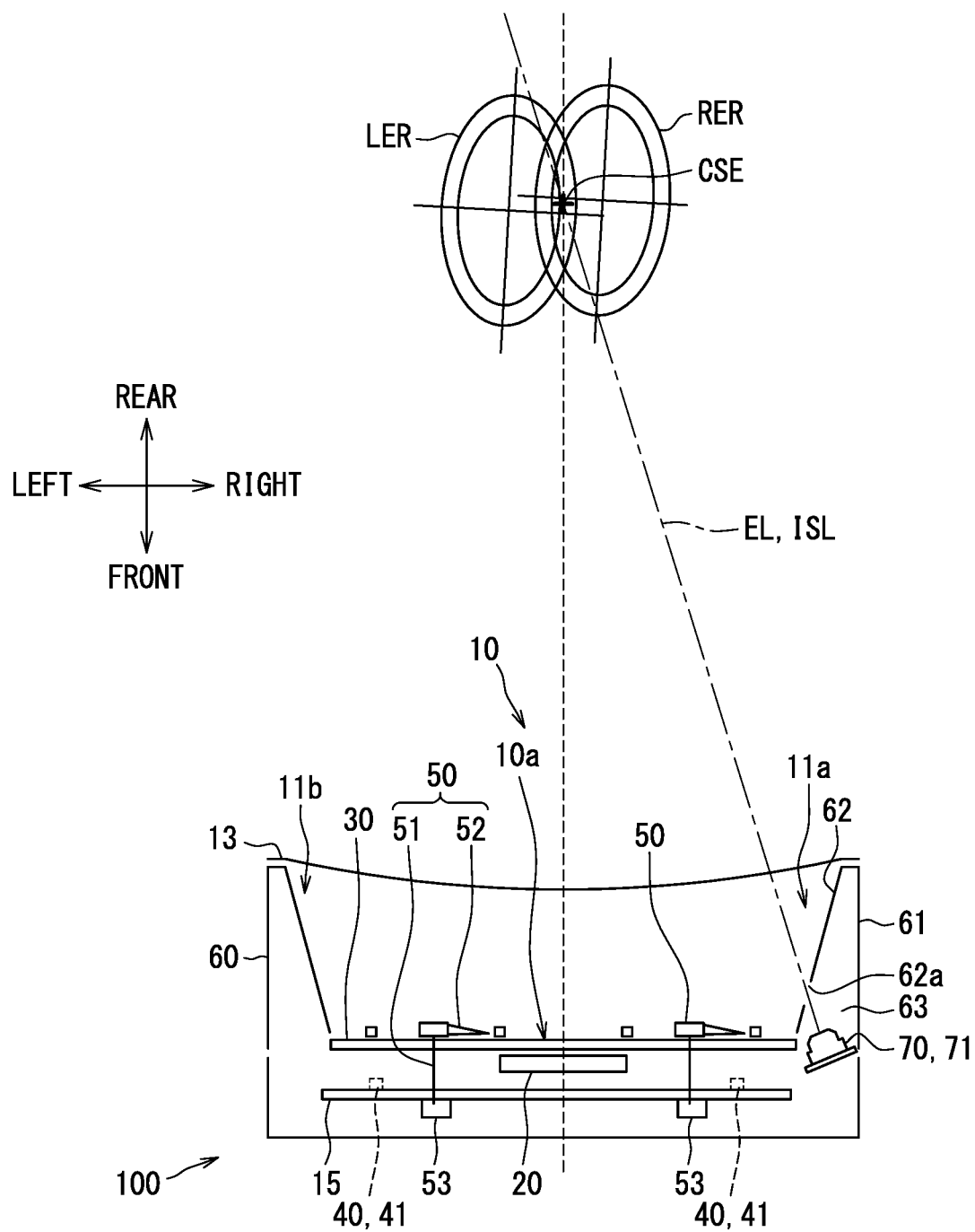
FIG. 2 is a cross-sectional view showing a horizontal cross section of the vehicular display device in the first embodiment.
Figure 3:
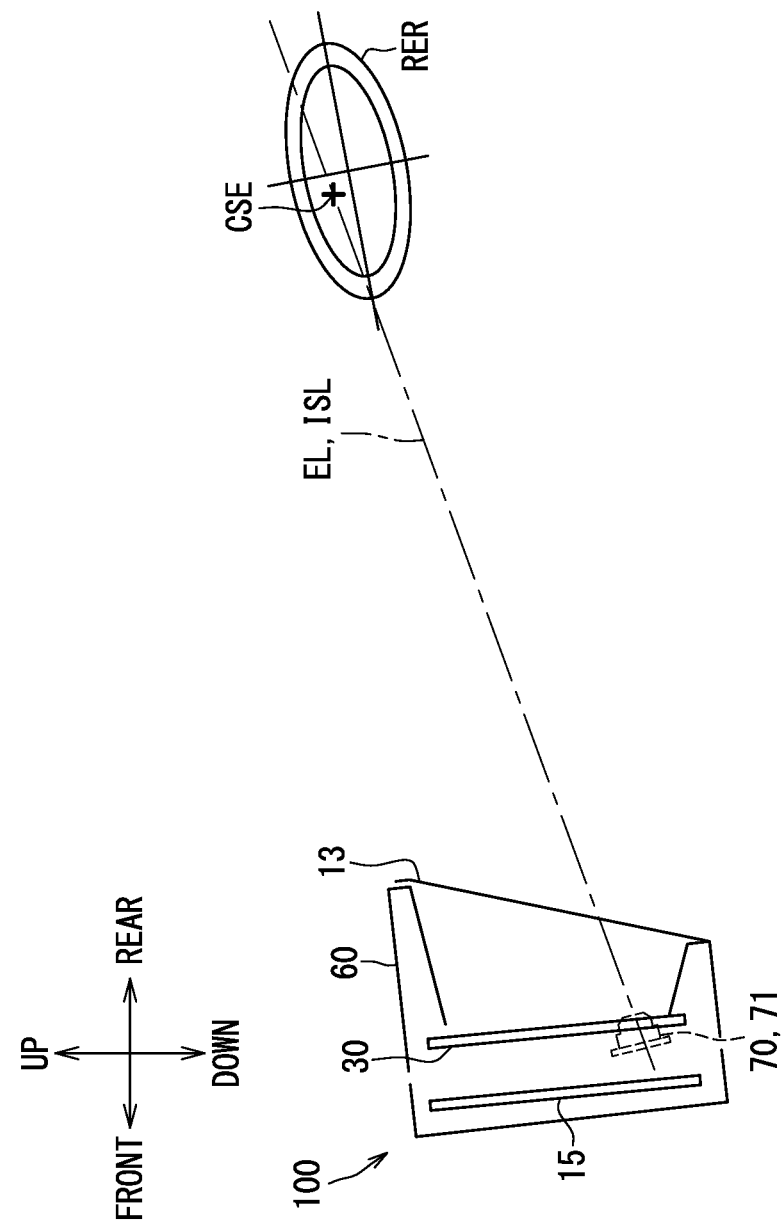
FIG. 3 is a cross-sectional view showing a vertical cross section of the vehicular display device in the first embodiment.

As shown in FIGS. 2 to 3, the vehicular display device 100 serves as a combination meter including a combination of analog display achieved by indicators 50 indicating index marks 31 and digital display achieved by an image displayed by an image display element 20. The analog display and the digital display are performed in a center display portion 10 that displays information toward the passenger located on the visual-recognition side at the center of the device.

Examples of the displayed information include a speed of the vehicle 1, the number of engine revolutions, a remaining fuel amount, a temperature of engine cooling water, a current value of an electric motor, and a state of the vehicle 1 such as an abnormality in the vehicle 1. Other examples of the displayed information include various information items such as an alarm, road information, field-of-view assisting information, and an e-mail. Since the vehicular display device 100 is disposed on a side (hereinafter referred to as the counter-visual-recognition side) opposite to the visual-recognition side relative to the steering operation portion 4, the information thus displayed by the center display portion 10 can be visually recognized from a center of standard eye points CSE mainly through the opening portion 4e of the steering operation portion 4.

The center of standard eye points CSE mentioned herein is a virtual point set for each vehicle to represent a left eye position and a right eye position of a driver in a normal driving status. The center of standard eye points CSE is generally set at a height of 635 mm immediately above a seating reference point. The seating reference point refers to a position of a H-point in a human body model (hip joint point in the model) when the human body model is placed to occupy a seat such as the driver seat in accordance with a seating method defined in ISO 6549-1980 or to a design standard position set over a seat corresponding thereto.

The vehicular display device 100 thus configured includes the image display element 20, a display plate 30, a display light source portion 40, the indicators 50, a wind plate 60, the imaging device 70, and the like.

In the present embodiment, the center of standard eye points CSE substantially coincides with a middle point between a center of a left eye range LER and a center of a right eye range RER.

In the present embodiment, the image display element 20 is a liquid crystal display element employing a transmission-type liquid crystal panel using a thin film transistor (TFT), which is an active-matrix liquid crystal panel formed of a plurality of liquid crystal pixels arranged in two-dimensional directions. Note that, as the image display element 20, an organic EL display or the like other than a liquid crystal display element may also be employed.

The display plate 30 is generally referred to also as a dial plate, which is an exposed component exposed in a space enclosed by the wind plate 60 and a transparent plate 13 closing a visual-recognition-side opening portion of the wind plate 60 in the vehicular display device 100. The display plate 30 is formed of a translucent base material made of a synthetic resin such as a polycarbonate resin or an acrylic resin and having a surface with semi-lucent or light-blocking printing partially or entirely performed thereon to have a flat plate shape. Note that, instead of printing, coating may also be performed on the surface of the display plate 30. Alternatively, an optical resin or an optical filter material which transmits near-infrared light may also be held on the display plate such as by being stuck thereto.

The display plate 30 is disposed on the visual-recognition side of the image display element 20. Onto a portion of the display plate 30 which overlaps the image display element 20, printing or the like is not performed and, consequently, an image is displayed on the visual-recognition side without interfering with the display plate 30. On left and right regions of the display plate 30 with the image display element 20 being interposed therebetween, the respective index marks 31 indicated by the indicators 50 are formed. The index marks 31 of the display plate 30 are illuminated with light from the display light source portion 40 on the counter-visual-recognition side.

The display light source portions 40 are disposed on the counter-visual-recognition side of the display plate 30 and have a plurality of display light emitting elements 41 each of which emits visible display light. For each of the display light emitting elements 41, for example, a light emitting diode element is used. Each of the display light emitting elements 41 is connected to a power source through a conductive pattern on a substrate 15 having a flat-plate shape to emit visible display light toward the display plate 30. Specifically, each of the display light emitting elements 41 emits, as the visible display light, white light made of light widely distributed in a wavelength range of about 400 to 800 nm.

In the display plate 30, a light blocking region and a display region are formed by printing described above or the like. The light blocking region occupies a large area in the display plate 30 and is dark-colored (e.g., blackened) by light-blocking printing or the like to thus block the visible display light from the counter-visual-recognition side. The display region is subjected to or not subjected to semi-lucent printing to thus transmit the visible display light from the counter-visual-recognition side. Since the index marks 31 are set in the display region, the index marks 31 are displayed, while emitting light.

The plurality of indicators 50 are disposed such that the image display element 20 is laterally interposed therebetween. Particularly in the present embodiment, the one indicator 50 is provided in each of regions on the left and right sides of the image display element 20. Each of the indicators 50 integrally has a joining portion 51 and an indicating portion 52. The joining portion 51 is disposed on the counter-visual-recognition side of the display plate 30 to be joined to a rotation shaft of a stepping motor 53 held by the substrate 15. The indicating portion 52 is disposed on the visual-recognition side of the display plate 30 and needle-shaped to be able to indicate the index marks 31.

Each of the indicators 50 is rotative around the rotation shaft in accordance with an output from the stepping motor 53 to indicate the index marks 31 corresponding thereto and thus display information corresponding to an indicating position. Particularly in the present embodiment, the left indicator 50 and the left index marks 31 display the speed of the vehicle 1, while the right indicator 50 and the right index marks 31 display the number of engine revolutions of the vehicle 1.

In the present embodiment, in addition to the image display element 20, the indicators 50 and the index marks 31 indicated by the indicators 50 form the center display portion 10. A visual-recognition-side surface of the display plate 30 substantially forms a display surface 10a of the center display portion 10.

The wind plate 60 is referred to also as a facing plate and formed into a tubular shape along an outer periphery of the vehicular display device 100 so as to surround the display plate 30, while protruding on the visual-recognition side of the display plate 30. The wind plate 60 has a surface formed in a dark color (e.g., black). This adds a sense of depth to the vehicular display device 100 and restricts reflection of externally incident light to enhance the visibility of the center display portion 10, while rendering the wind plate 60 less conspicuous.

The wind plate 60 has an outer peripheral wall portion 61 extending generally perpendicularly to the display plate 30, while facing an outer peripheral side, and an inner peripheral wall portion 62 inclined to be closer to the outer peripheral wall portion 61 on the outer peripheral side with approach to the visual-recognition side, while facing an inner peripheral side.

Figure 4:
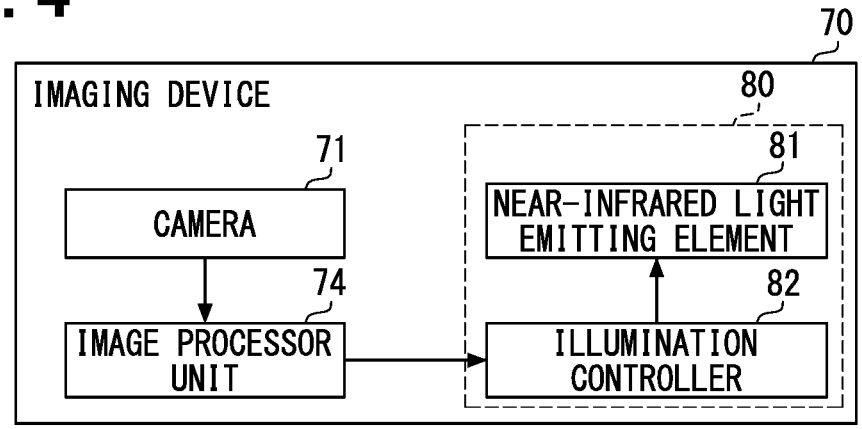
FIG. 4 is a block diagram showing a configuration of the imaging device in the first embodiment.

As shown also in FIG. 4, the imaging device 70 includes a camera 71, an image processor unit 74, an illumination unit 80, and the like.

Figure 5:
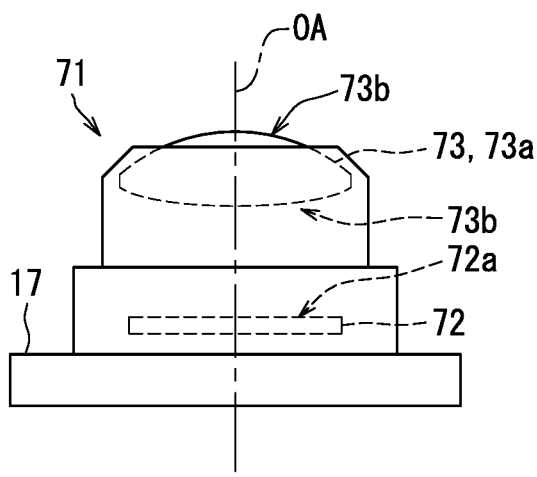
FIG. 5 is an enlarged view showing a camera of the first embodiment in enlarged relation.

As specifically shown in FIG. 5, the camera 71 is located in one of the lateral portions 11 of the vehicular display device 100. The lateral portions 11 mentioned herein are portions of the vehicular display device 100 which are located lateral to the center display portion 10 in a vehicle lateral direction. A pair of a lateral portion 11a located on a right side of the center display portion and a lateral portion 11b located on a left side of the center display portion are provided.

As shown in FIG. 1, the vehicular display device 100 is provided to be rightwardly offset from the longitudinal median plane LMP. Accordingly, the lateral portion 11a as one of the pair of lateral portions 11 is at a shorter distance to the side window 5a. The camera 71 of the present embodiment is located in the lateral portion 11a mentioned above.

As shown in FIG. 5, the camera 71 is held by a camera holding member 17 separate from the substrate 15. The camera 71 has an imaging element 72 and a lens portion 73 for forming an image of an object to be photographed onto the imaging element 72.

The imaging element 72 detects light incident on a rectangular imaging surface 72a formed by two-dimensionally arranging pixels each made of a detection element such as a photodiode. As the imaging element, an element which has an excellent sensitivity to light including visible light and near-infrared light and detects an image with a high resolution, such as a CMOS sensor, is used.

The lens portion 73 includes one or more lenses 73a. In the present embodiment, a virtual axis connecting respective centers of curvature of individual refractive surfaces 73b of the lenses 73a which refract light is defined as an optical axis OA. Even when an aspheric lens is included in the lens portion 73, the optical axis OA is defined as a rotational symmetry axis of each of the refractive surfaces 73b. In the present embodiment, the optical axis OA is set to extend through a center point of the imaging surface 72a in perpendicular relation to the imaging surface 72a.

As shown in FIG. 2, the camera 71 is located in an arrangement space 63 which is formed between the outer peripheral wall portion 61 and the inner peripheral wall portion 62 of the wind plate 60 in the lateral portion 11 and covered by the outer peripheral wall portion 61 and the inner peripheral wall portion 62 from the visual-recognition side. In addition, in a facing region of the inner peripheral wall portion 62 of the wind plate 60 facing the lens portion 73 of the camera 71, a plate opening hole 62a is formed. Thus, the camera 71 is located in the arrangement space 63, which tends to be a dead space, to allow the arrangement space 63 to be effectively used.

The camera 71 is located with the optical axis OA and the imaging surface 72a thereof being inclined with respect to the visual-recognition-side surface of the display plate 30. Specifically, the camera 71 is inclined such that the lens portion 73 thereof faces the inner peripheral side (i.e., left side) of the vehicular display device 100. Note that an angle of the inclination of the imaging surface 72a with respect to the display plate 30 is set smaller than an angle of the inclination of the inner peripheral wall portion 62 with respect to the display plate 30.

A virtual extension line EL obtained by extending the optical axis OA to the visual-recognition side is set to extend through the opening portion 4e of the steering operation portion 4 at the normal position. Particularly in the present embodiment, the extension line EL is set so as to extend through the center of standard eye points CSE.

As a result, the camera 71 allows light which has passed through the opening portion 4e from the vicinity of the center of standard eye points CSE and then passed through the plate opening hole 62a to be detected by the imaging element. In other words, the camera 71 can photograph a passenger through the opening portion 4e.

Figure 6:
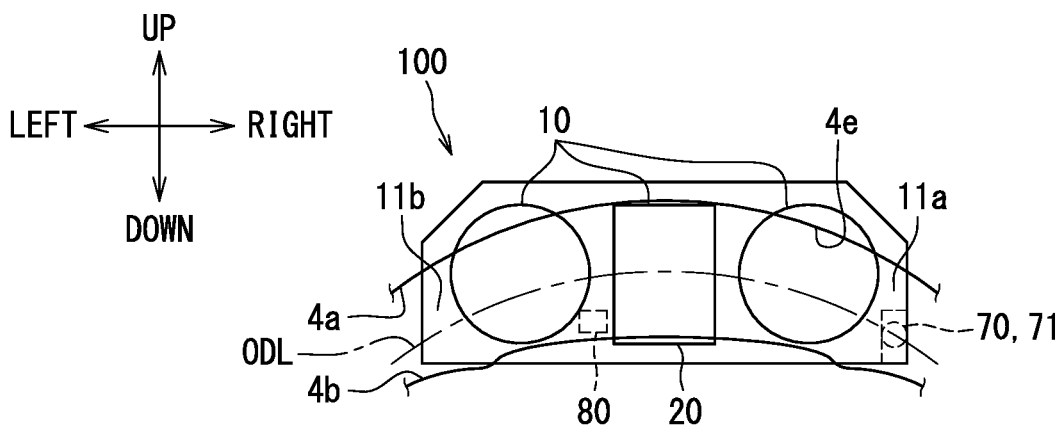
FIG. 6 is a front view for illustrating a relationship between the camera and an opening portion in the first embodiment.

As shown in FIGS. 6 and 7, in the opening portion 4e of the steering operation portion 4 at the normal position, a virtual opening division line ODL is defined to connect positions each equidistant between the rim portion 4a and the connecting portion 4b. Consequently, the camera 71 of the present embodiment is located at a position at which an imaginary straight line ISL connecting the center of standard eye points CSE and a predetermined point on the opening division line ODL intersects the lateral portion 11.

The image processor unit 74 shown in FIG. 4 is implemented as a functional block built to include, as a main component, an electronic circuit in which at least one processor, a memory, an input/output interface, and the like are mounted on the substrate 15. The processor executes a computer program stored in the memory based on a signal input to the processor from the imaging element 72 through the input/output interface to be able to perform image processing. The electronic circuit may also be provided separately for the image processor unit 74 or may also be shared by a control circuit for controlling the image display element 20, the indicators 50, and the like.

Specifically, the image processor unit 74 generates image data based on the signal input thereto from the imaging element 72. The generated image data may be output directly to the outside of the vehicular display device 100, such as an ECU (Electric Control Unit) of the vehicle 1, and analyzed by the ECU or, alternatively, the image processor unit 74 may also analyze the generated image data to determine whether or not a driver is sleeping or distracted while driving.

The illumination unit 80 shown in FIGS. 4 and 6 illuminates the passenger to be photographed by the camera 71 with illuminating light. The illumination unit 80 is disposed in a portion of the vehicular display device 100 other than the lateral portion 11a in which the camera 71 is located. Specifically, the illumination unit 80 of the present embodiment is located in the vicinity of the image display element 20 in the center display portion 10.

The illumination unit 80 has a near-infrared light emitting element 81 and an illumination controller 82. For the near-infrared light emitting element 81, for example, a light emitting diode is used. The near-infrared light emitting element 81 is disposed on the counter-visual-recognition side of the display plate 30. More specifically, the near-infrared light emitting element 81 is held on a visual-recognition-side surface of the substrate 15 and connected to the power source through the conductive pattern on the substrate 15 to emit near-infrared light as the illuminating light. Particularly in the present embodiment, the near-infrared light emitting element 81 having wavelength properties including, for example, a peak wavelength of 850 nm and a half-value width of about 30 to 40 nm is used.

The illumination controller 82 is implemented as a functional block built to include, as a main component, an electronic circuit in which at least one processor, a memory, an input/output interface, and the like are mounted on the substrate 15. The electronic circuit may be provided separately for the illumination unit 80 or may also be used commonly as an electronic circuit implementing the image processor unit 74. Alternatively, the electronic circuit may also be shared by the control circuit for controlling the image display element 20, the indicators 50, and the like.

In response to turning ON and OFF of an ignition switch of the vehicle 1 or the like, the illumination controller 82 controls the turning ON and OFF of the near-infrared light emitting element 81. When the near-infrared light emitting element 81 is ON, the illumination controller 82 controls an amount of emitted light based on a brightness, a contrast, or the like in the image data generated by the image processor unit 74.

(Functions and Effects)

The functions and effects of the first embodiment described above will be described again below.

According to the first embodiment, the camera 71 is located in one of the lateral portions 11 located lateral to the center display portion 10. Such a location of the camera 71 exerts less influence on a layout of individual components used for display on the center display portion 10. Accordingly, it is possible to suppress the display on the center display portion 10 from being restricted. In addition, since the lateral portions 11 are less frequently visually recognized by the passenger than the center display portion 10 and the passenger is led to pay attention to the center display portion 10, a place at which the camera 71 is located is less conspicuous. Therefore, it is possible to provide the imaging device 70 in which display is less restricted by the location of the camera 71 for photographing a passenger and which has outer appearance less affected by the location of the camera 71.

Also, according to the first embodiment, the camera 71 is located to be inclined with respect to the display surface 10a of the center display portion 10 such that the extension line EL of the optical axis OA extends through the opening portion 4e at the normal position. Accordingly, even when the camera 71 is located in the lateral portion 11 located lateral to the center display portion 10, it is possible to render the location of the camera 71 less conspicuous, while restricting the photographing range FC from being interrupted by the steering operation portion 4 and allowing the passenger to be reliably photographed.

Also, according to the first embodiment, the extension line EL of the optical axis OA is set so as to extend through the center of standard eye points CSE set in the vehicle 1. This can enhance the probability of allowing the face of the passenger to be located at the center of the photographing range FC and photographed. Therefore, it is possible to render the location of the camera 71 less conspicuous, while allowing the passenger to be easily photographed.

Also, according to the first embodiment, the camera 71 is located at a position in the lateral portion 11 which is intersected by the imaginary straight line ISL connecting the center of standard eye points CSE and the point on the opening division line ODL. This can achieve a balance between the portion of the photographing range FC covered by the camera 71 which is interrupted by the rim portion 4a of the steering operation portion 4 and the portion of the photographing range FC which is interrupted by the connecting portion 4b of the steering operation portion 4, i.e., can equalize the hidden range. Accordingly, even when the passenger is slightly displaced from the opening portion 4e in a direction of the rim portion 4a with respect to the center of standard eye points CSE or when the passenger is slightly displaced from the opening portion 4e in a direction of the connecting portion 4b with respect to the center of standard eye points CSE, it is possible to render the location of the camera 71 less conspicuous, while avoiding the passenger from being interrupted by the steering operation portion 4 and allowing the passenger to be easily photographed.

A detailed description will be given herein using first and second comparative examples. In the first comparative example shown in FIGS. 8 and 9, a camera 871 is located above the image display element 20 in the center display portion 10. In this case, not only the camera 871 becomes more conspicuous, but also a major part of an upper half of the photographing range FC is interrupted by the rim portion 4a of the steering operation portion 4. As a result, when the passenger is upwardly displaced from the point of standard eye points CSE, the face of the passenger is interrupted by the rim portion 4a and can no longer be photographed. Consequently, it becomes difficult even to determine a status of the passenger.

In the second comparative example shown in FIGS. 10 and 11, a camera 971 is located below the image display element 20 in the center display portion 10. In this case, not only the camera 971 becomes more conspicuous, but also a major part of a lower half of the photographing range FC is interrupted by the connecting portion 4b of the steering operation portion 4. As a result, when the passenger is downwardly displaced from the point of standard eye points CSE, the face of the passenger is interrupted by the connecting portion 4b and can no longer be photographed. Consequently, it becomes difficult even to determine a status of the passenger.

By contrast, in the present embodiment, as shown in FIG. 7, a balance is achieved between the portion of the photographing range FC which is interrupted by the rim portion 4a of the steering operation portion 4 and the portion of the photographing range FC which is interrupted by the connecting portion 4b of the steering operation portion 4. Accordingly, even when the passenger is upwardly or downwardly displaced with respect to the point of standard eye points CSE, it is possible to reduce an adverse effect on photographing.

Also, according to the first embodiment, the imaging device 70 further includes the illumination unit 80 disposed in a portion of the vehicular display device 100 other than the lateral portion 11a in which the camera 71 is located to illuminate the passenger with the illuminating light. By thus disposing the illumination unit 80 at a position away from the position at which the camera 71 is located, even when the illuminating light is reflected to return toward the camera 71, an angle difference is produced between the reflected light and the optical axis OA of the camera 71. Accordingly, even when the illuminating light is reflected by pupils of the passenger, eyeglasses worn thereby, or the like, it is possible to suppress an adverse effect (e.g., erroneous detection of the reflected light as another object due to a red-eye effect, ball-like glare spots, or the like) resulting from detection of the reflected light by the camera 71. Consequently, it is possible to render the location of the camera 71 less conspicuous, while allowing the passenger to be easily photographed.

Also, according to the first embodiment, the camera 71 is located in the lateral portion 11a as one of the pair of lateral portions 11 which is at a shorter distance to the side window 5a of the vehicle 1 than the other 11b. When the camera 71 is thus located, the lateral portion 11a in which the camera 71 is located is likely to be under the shadow of the hood 2b cast by light incident through the side window 5a toward the vehicular display device 100. Accordingly, it is possible to render the location of the camera 71 less conspicuous, while suppressing the influence of the light from the outside on the camera 71 and allowing the passenger to be easily photographed.

Also, according to the first embodiment, the camera 71 is located in one of the lateral portions 11 located lateral to the center display portion 10. Such a location of the camera 71 exerts less influence on the layout of the individual components used for the display on the center display portion 10. Accordingly, it is possible to suppress the display on the center display portion 10 from being restricted. In addition, since the lateral portions 11 are less frequently visually recognized by the passenger than the center display portion 10 and the passenger is led to pay attention to the center display portion 10, the place at which the camera 71 is located is less conspicuous. Therefore, it is possible to provide the vehicular display device 100 in which display is less restricted by the location of the camera 71 for photographing a passenger and which has outer appearance less affected by the location of the camera 71.

Second Embodiment

Figure 12:
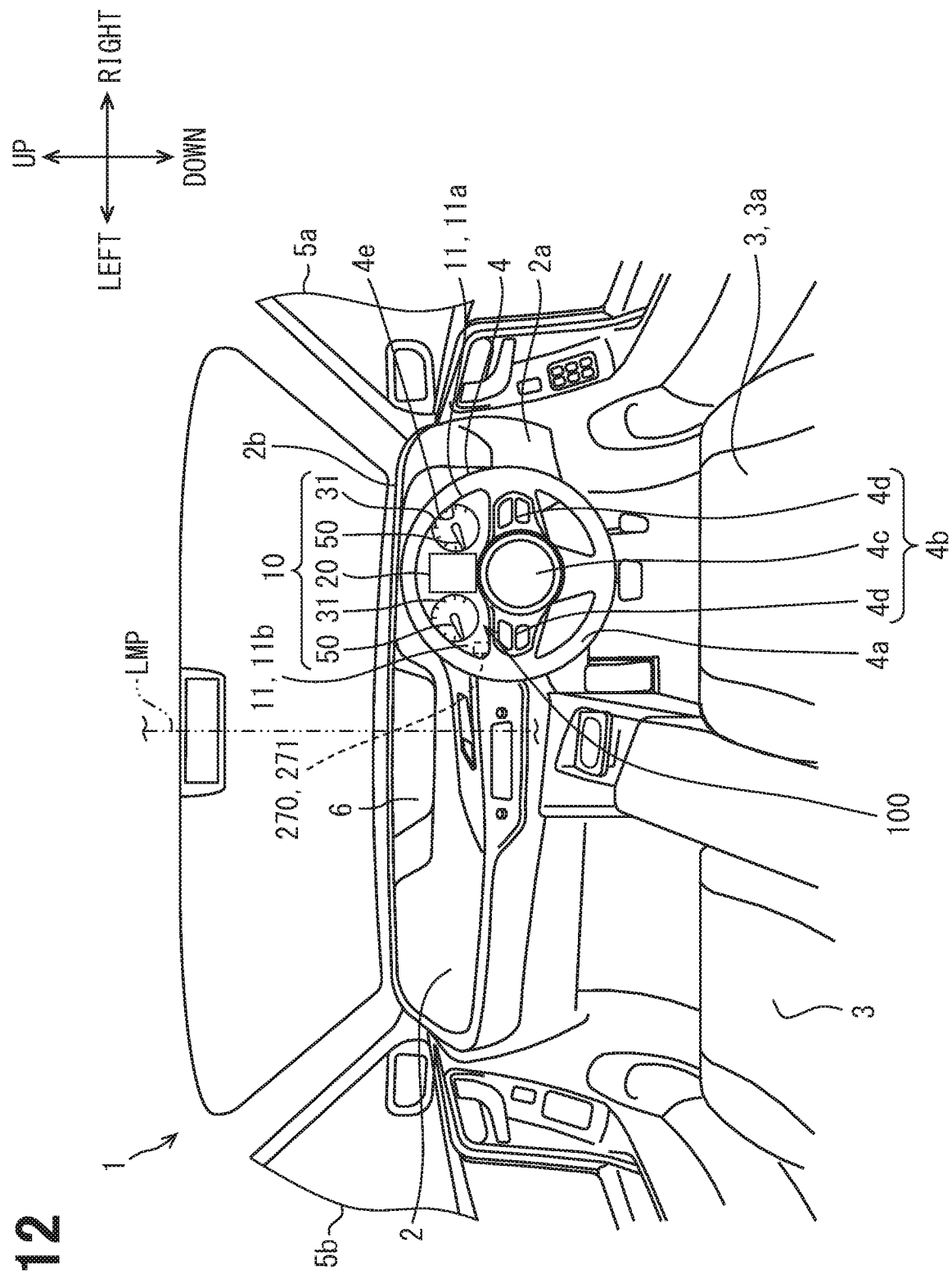
FIG. 12 is a view showing a layout of a vehicular display device including an imaging device in a vehicle in a second embodiment.

As shown in FIG. 12, a second embodiment is a modification of the first embodiment. A description will be given of the second embodiment with emphasis on points different from those in the first embodiment.

The driver seat 3a of the second embodiment is also disposed at the position rightwardly offset from the longitudinal median plane LMP of the vehicle 1. Accordingly, the vehicle 1 of the second embodiment is also a so-called right-hand-drive vehicle, and the vehicular display device 100 is also disposed at a position rightwardly offset from the longitudinal median plane LMP.

In the vehicle 1 of the second embodiment, in a center portion configured to be located leftward of the vehicular display device 100 and in the vicinity of the longitudinal median plane LMP, the same center-located devices 6 as located in the first embodiment are located. Since the driver as the passenger may perform an operation of checking the devices 6 mentioned above, the driver as the passenger tends to face the left side of the vehicular display device 100 more frequently and for a longer period of time than facing the right side of the vehicular display device 100. The driver as the passenger also tends to face the left side at an angle larger than an angle at which the driver as the passenger faces the right side.

In view of this tendency, a camera 271 in an imaging device 270 of the second embodiment is located in the lateral portion 11b as one of the pair of lateral portions 11 which is at a shorter distance to the longitudinal median plane LMP. The camera 271 has the optical axis OA and the imaging surface 72a thereof each located to be inclined with respect to the visual-recognition-side surface of the display plate 30. Specifically, the camera 271 is inclined such that the lens portion 73 thereof faces the inner peripheral side (i.e., right side) of the vehicular display device 100.

According to the second embodiment described above, the camera 271 is located in the lateral portion 11b as one of the pair of lateral portions 11 which is at a shorter distance to the longitudinal median plane LMP. Since the passenger such as the driver tends to face the longitudinal median plane LMP of the vehicle 1, using this tendency, the camera 271 is located at a position directly in front of and facing the passenger such as the driver to thus increase the opportunity of photographing the passenger at an angle close to a head-on angle. Accordingly, it is possible to render the location of the camera 271 less conspicuous, while allowing the passenger to be easily photographed.

When the passenger is photographed from the front side, it is possible to further enhance the accuracy of determining a status, such as a sleeping status or a distracted status, of the driver.

Other Embodiments

While the description has been given of the plurality of embodiments heretofore, the disclosure should not be construed to be limited to the foregoing embodiments. The disclosure is applicable to various embodiments and a combination thereof within the scope not departing from the gist of the disclosure.

Specifically, in a first modification, the opening hole 62a need not necessarily be formed in the facing region of the inner peripheral wall portion 62 of the wind plate 60 facing the lens portion 73 of the camera 71. By way of example, the facing region may also be set to the near-infrared light transmission region. In the near-infrared light transmission region, a transmittance of near-infrared light is set high, while a transmittance of visible light at a wavelength shorter than that of the near-infrared light is set low. It is possible to suppress the camera from being clearly visually recognized by the passenger on the visual-recognition side, while allowing the near-infrared light transmitted by the near-infrared light transmission region to be detected by the imaging element 72.

In a second modification, as long as the camera 71 is located in one of the lateral portions 11, the camera 71 may also be located on the counter-visual-recognition side of the display plate 30, not in the arrangement space 63 of the wind plate 60.

In a third modification, the illumination unit 80 may also be disposed in one of the pair of lateral portions 11 in which the camera 71 is not located.

In a fourth modification, the illumination unit 80 need not necessarily form a portion of the imaging device 70 and also need not necessarily be provided in the vehicular display device 100.

In a fifth modification, the camera 71 may also be located to be displaced from a position intersected by the imaginary straight line ISL connecting the center of standard eye points CSE and the point on the virtual opening division line ODL.

In a sixth modification, the extension line EL of the optical axis OA of the camera 71 need not necessarily be set so as to extend through the point of standard eye points CSE.

In a seventh modification, at least a portion of the center display portion 10 may also display information outside the steering operation portion 4.

In an eighth modification, the image display element 20 need not necessarily be provided in the center display portion 10. Also, the indicators 50 and the index marks 31 need not necessarily be provided in the center display portion 10. As the center display portion 10, various configurations can be adopted.

In a ninth modification, the present disclosure is also applicable to the vehicular display device 100 disposed at a position leftwardly offset from the longitudinal median plane LMP of the vehicle 1 in a so-called left-hand-drive vehicle in which the driver seat 3a is leftwardly offset from the longitudinal median plane LMP.

What is claimed is:

1. An imaging device provided in a vehicular display device that is mounted in a vehicle and includes a center display portion and a pair of lateral portions, the center display portion having a display plate being configured to display, at a center of the device, information toward a passenger of the vehicle, the pair of lateral portions being located lateral to the center display portion, the imaging device comprising:
   a camera located in one of the pair of lateral portions and apart from the display plate to photograph the passenger,
   wherein a steering operation portion of the vehicle is disposed on a visual-recognition side of the vehicular display device, and the center display portion is configured to display the information through an opening portion of the steering operation portion at a normal position,
   wherein the steering operation portion has an annular rim portion and a connecting portion connecting the rim portion to a steering shaft,
   wherein the opening portion is provided between the rim portion and the connecting portion to define a semi-circular opening,
   wherein, when a virtual opening division line is defined to connect positions each equidistant between the rim portion and the connecting portion in the opening portion at the normal position, the camera is located in the one of the pair of lateral portions and at a position to which an imaginary straight line connecting a center of standard eye points set in the vehicle and the opening division line intersects, and wherein, the camera is aimed at the center of standard eye points and the camera is positioned so as to photograph the passenger through the opening portion of the steering operation portion.

2. The imaging device according to claim 1,
wherein the camera is located to be inclined with respect to a display surface of the center display portion such that an extension line of an optical axis extends through the opening portion of the steering operation portion at the normal position.

3. The imaging device according to claim 2,
wherein the extension line of the optical axis is set so as to extend through the center of standard eye points.

4. The imaging device according to claim 1, further comprising:
   an illumination unit disposed in a portion of the vehicular display device other than the one of the pair of lateral portions in which the camera is located to illuminate the passenger with illuminating light.

5. The imaging device according to claim 1,
wherein the vehicular display device is covered, from above, with a hood protruding on the visual-recognition side of the vehicular display device, and
wherein the camera is located in the one of the pair of lateral portions, the one being closer to a side window of the vehicle than the other.

6. The imaging device according to claim 1,
wherein the vehicular display device is provided at a position in the vehicle offset from a longitudinal median plane of the vehicle; and
wherein the camera is located in the one of the pair of lateral portions, the one being closer to the longitudinal median plane than the other.

7. The imaging device according to claim 1,
wherein the vehicular display includes a wind plate,
wherein the wind plate includes an outer peripheral wall portion, an inner peripheral wall portion, and an arrangement space,
wherein the arrangement space is formed between the outer peripheral wall portion and the inner peripheral wall portion and is covered by the outer peripheral wall portion and the inner peripheral wall portion from the visual-recognition side, and
wherein the camera is located in the arrangement space of the wind plate.

8. A vehicular display device mounted in a vehicle, the vehicular display device comprising:
   a center display portion having a display plate that is configured to display, at a center of the device, information toward a passenger of the vehicle;
   a pair of lateral portions located lateral to the center display portion; and
   a camera located in one of the lateral portions and apart from the display plate to photograph the passenger,
   wherein a steering operation portion of the vehicle is disposed on a visual-recognition side of the vehicular display device, and the center display portion is configured to display the information through an opening portion of the steering operation portion at a normal position,
   wherein the steering operation portion has an annular rim portion and a connecting portion connecting the rim portion to a steering shaft,
   wherein the opening portion is provided between the rim portion and the connecting portion to define a semicircular opening,
   wherein, when a virtual opening division line is defined to connect positions each equidistant between the rim portion and the connecting portion in the opening portion at the normal position, the camera is located in the one of the pair of lateral portions and at a position to which an imaginary straight line connecting a center of standard eye points set in the vehicle and the opening division line intersects, and
   wherein the camera is aimed at the center of standard eye points and the camera is positioned so as to photograph the passenger through the opening portion of the steering operation portion.

9. The vehicular display device according to claim 8, further comprising
   a wind plate having an outer peripheral wall portion, an inner peripheral wall portion, and an arrangement space,
   wherein the arrangement space is formed between the outer peripheral wall portion and the inner peripheral wall portion and is covered by the outer peripheral wall portion and the inner peripheral wall portion from the visual-recognition side, and
   wherein the camera is located in the arrangement space of the wind plate.

10. A vehicular display and imaging device that is mounted in a vehicle and includes a center display portion and a pair of lateral portions, the vehicular display and imaging device comprising:
    a display plate in the center display portion, the display plate including analog and electrical displays and the display plate positioned behind a steering wheel of the vehicle and arranged to face a driver of the vehicle,
    a wind plate at each of the pair of lateral portions, each wind plate including an outer peripheral wall portion, an inner peripheral wall portion, and an arrangement space; and
    a camera configured to capture an image of the driver, wherein
    the steering wheel is positioned between the driver of the vehicle and the display plate,
    the steering wheel has
        an annular rim portion,
        a connecting portion that connects the rim portion to a steering shaft, and
        an opening portion disposed between the rim portion and the connecting portion that defines a semicircular opening,
    each inner peripheral wall portion of the wind plates is connected to the display plate,
    each inner peripheral wall portion and each outer peripheral wall portion of the wind plates extends away from the display plate toward the steering wheel,
    each arrangement space being a space bounded by the inner peripheral wall portion and the outer peripheral wall portion of the wind plate,
    the camera is disposed in the arrangement space of one of the wind plates, the wind plate having the camera disposed within the arrangement space including an opening on the inner peripheral wall, and
    the camera is aimed at a central position between eyes of the driver and positioned so as to capture the image of the driver through the opening on the inner peripheral wall and through the opening portion of the steering wheel.

* * * * *